(12) United States Patent
Hall et al.

(10) Patent No.: US 7,570,220 B2
(45) Date of Patent: Aug. 4, 2009

(54) RESONANT CIRCUIT TUNING SYSTEM WITH DYNAMIC IMPEDANCE MATCHING

(75) Inventors: Stewart E. Hall, Wellington, FL (US); Richard Herring, Wellington, FL (US); Guillermo Padula, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 286 days.

(21) Appl. No.: 11/475,771

(22) Filed: Jun. 27, 2006

(65) Prior Publication Data

US 2007/0296593 A1    Dec. 27, 2007

(51) Int. Cl.
*H01Q 9/00* (2006.01)
(52) U.S. Cl. ............... 343/745; 343/867; 340/572.7
(58) Field of Classification Search ............... 343/745, 343/866, 867; 340/572.5, 572.7
See application file for complete search history.

(56) References Cited

U.S. PATENT DOCUMENTS

| | | | |
|---|---|---|---|
| 5,051,727 A * | 9/1991 | Fockens | 340/572.4 |
| 5,170,496 A * | 12/1992 | Viereck | 455/121 |
| 5,172,061 A | 12/1992 | Crooks et al. | |
| 5,963,173 A | 10/1999 | Lian et al. | |
| 6,016,129 A * | 1/2000 | Lauper | 343/867 |
| 6,118,378 A * | 9/2000 | Balch et al. | 340/572.7 |
| 6,862,719 B2 | 3/2005 | Embling et al. | |
| 6,952,167 B2 * | 10/2005 | Wakabayashi | 340/572.5 |
| 2005/0219132 A1 | 10/2005 | Charrat | |

OTHER PUBLICATIONS

PCT International Search Report, Applicant: Sensormatic Electronics Corporation, Int'l Filing Date Jun. 27, 2006, Int'l App. No. PCT/US2006/025054, (3 pgs.).

* cited by examiner

*Primary Examiner*—Tho G Phan
(74) *Attorney, Agent, or Firm*—Dean D. Small; The Small Patent Law Group

(57) ABSTRACT

A resonant circuit tuning system and a method for tuning are provided. The resonant circuit tuning system may include a resonant circuit having a first capacitive element in series between a transmitter and an antenna coil and a second capacitive element in parallel with the transmitter and the antenna coil. At least one of the first capacitive element and second capacitive element may be configured to be varied. The resonant circuit tuning system also may include a controller for controlling a variable value of at least one of the first and second capacitive elements.

6 Claims, 3 Drawing Sheets

US 7,570,220 B2

RESONANT CIRCUIT TUNING SYSTEM WITH DYNAMIC IMPEDANCE MATCHING

BACKGROUND OF THE INVENTION

1. Field of the Invention

This invention relates generally to electronic tuning systems, and more particularly to a resonant tuning system with dynamic impedance matching.

2. Description of the Related Art

Magnetic fields are used in many electronic systems for a variety of purposes such as Electronic Article Surveillance (EAS), Radio Frequency Identification (RFID), metal detectors, magnetic imaging systems, remote sensing, communications, etc. In these various electronic systems, a magnetic coil may be used as a transmitter to project a magnetic field into a desired sensing region. More particularly, for the transmitters, a highly efficient method for generating magnetic fields includes the use of a series resonant LCR circuit that presents a low impedance to the transmitter at the transmit frequency. To achieve high magnetic field levels from the antenna of the transmitter, it is desirable for the transmitter to deliver high currents to the antenna coil. Therefore, to achieve high performance, it is desirable to maximize the current delivered from the transmitter into the coil.

One method for maximizing the current delivered from the transmitter is to use a LCR circuit with a high quality factor (Q). This high Q may be accomplished by increasing the inductance of the antenna coil and by reducing the total series resistance of the circuit. Increasing the Q of the LCR circuit also increases the need for tuning, and more particularly, fine tuning of the resonant frequency of the LCR circuit. Due to tolerances in design and the resonant capacitor in the circuit, the circuit is tuned to match the natural resonant frequency of the LCR circuit to the frequency of the transmitter. It is known to use a bank of capacitors having a plurality of capacitors arranged in either series or parallel combinations to control the tuning of the coil of the LCR circuit. The capacitors may be switched into the circuit as needed.

Additionally, the use of a high inductance and high Q LCR circuit results in an increase in the voltage across the coil. Such increased voltage often necessitates the use of insulation of the coil to avoid or reduce partial discharge and corona discharges. Further, regulatory requirements may limit the amplitude of the output current, which may increase the cost of the circuit to meet the requirements. Thus, a low number of coil turns are needed to reduce the voltage. However, in high power applications, a high number of coil turns are needed to reduce the current. These opposing constraints result in a limitation of the amount of magnetic field that may be produced from, for example, an antenna having such an LCR circuit. It is known to provide a hybrid series-parallel resonant circuit to maintain a high magnetic field strength while reducing the increase in inductance and voltage. This circuit is limited in that the circuit does not allow compensation, for example, for tolerances in antenna coil construction and/or installation environment variations.

Thus, these known circuits for tuning often result in either increased power requirements and/or increased cost. Further, these known circuits may not perform satisfactorily because of the inability to provide compensation for variations of changes that affect the circuit.

BRIEF DESCRIPTION OF THE INVENTION

In an embodiment, a resonant circuit tuning system is provided that may include a resonant circuit having a first capacitive element in series between a transmitter and an antenna coil and a second capacitive element in parallel with the transmitter and the antenna coil. At least one of the first capacitive element and second capacitive element may be configured to be varied. The resonant circuit tuning system also may include a controller for controlling a variable value of at least one of the first and second capacitive elements.

In another embodiment, a transmitting antenna is provided that may include a plurality of coils defining a transmission portion and a resonant tuning portion. The resonant tuning portion may include at least one variable capacitive element and at least one variable inductive element together configured to control at least one of a resonant frequency and a resonant impedance of the transmission portion. The variable capacitive element may be in one of a series arrangement and parallel arrangement with a transmitter and the plurality of coils. The inductive element may be in one of a series arrangement and magnetically coupled to the plurality of coils.

In yet another embodiment, a method for resonant tuning is provided. The method may include sensing at least one of a current and voltage of an antenna coil and adjusting a variable capacitive element of a resonant circuit tuning system to vary a resonant impedance of the coil based on the sensing. The variable capacitive element may be in one of a series arrangement and parallel arrangement with a transmitter and the antenna coil.

BRIEF DESCRIPTION OF THE DRAWINGS

For a better understanding of the various embodiments of the invention, together with other objects, features and advantages, reference should be made to the following detailed description which should be read in conjunction with the following figures wherein like numerals represent like parts.

DETAILED DESCRIPTION OF THE INVENTION

For simplicity and ease of explanation, the invention will be described herein in connection with various embodiments thereof. Those skilled in the art will recognize, however, that the features and advantages of the various embodiments of the invention may be implemented in a variety of configurations. It is to be understood, therefore, that the embodiments described herein are presented by way of illustration, not of limitation.

Various embodiments of the invention provide a system and method for resonant tuning with dynamic impedance matching. One or more variable or adjustable reactive elements are provided in a resonant circuit. The variable or adjustable reactive elements allow adjustment of at least one of the resonant frequency and the effective resonant impedance of the resonant circuit. It should be noted that the resonant circuit tuning system and method may be used in connection with any type of electronic system, for example, in electronic systems wherein a coil is used as a transmitter. The resonant circuit tuning system and method also may be used in different types of applications, for example, Electronic Article Surveillance (EAS), Radio Frequency Identification (RFID), metal detectors, magnetic imaging systems, remote sensing, communications, etc. However, the various embodiments may be implemented in other applications for use with different electronic devices as desired or needed.

Figure 1:
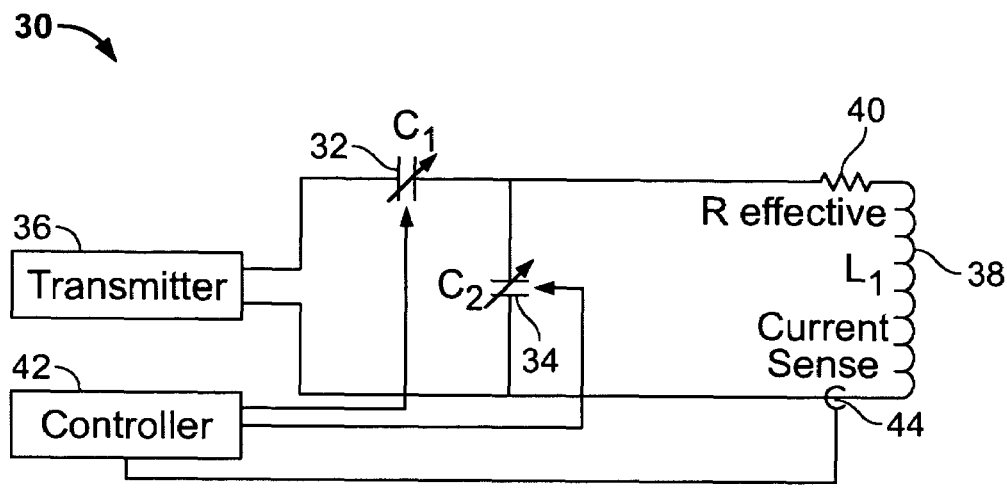
FIG. 1 is a schematic diagram of a resonant circuit tuning system constructed in accordance with an embodiment of the invention having two variable capacitive elements.

FIG. 1 illustrates a resonant circuit tuning system 30 constructed in accordance with an embodiment of the invention and may include a first variable capacitive element 32 ($C_1$), such as a variable capacitor, also referred to as a varactor, which may be connected in series with a second variable capacitive element 34 ($C_2$). The first variable capacitive element 32 and the second variable capacitive element 34 may be connected to a communication device 36, for example, a transmitter. An inductive element 38 ($L_1$), for example, a winding that may be configured as a transmitting antenna, such as, an antenna for an EAS antenna pedestal also may be provided. The inductive element 38 may be connected in parallel to the second variable capacitive element 34. A resistive element 40 ($R_{effective}$ or $R_1$) representing losses in the inductive element 38 may be connected in series with the first variable capacitive element 32. The first variable capacitive element 32, second variable capacitive element 34 and inductive element 38 may generally form a resonant circuit. Alternatively, the first variable capacitive element 32 and second variable capacitive element 34 may generally form a resonant tuning portion and the inductive element 38 may generally form a transmission portion. It should be noted that any two variable reactive elements may be used and the various embodiments are not limited to a variable capacitor.

A controller 42 may be connected to each of the first variable capacitive element 32 and second variable capacitive element 34. The controller 42 also may be connected to one end of the inductive element 38 at a sensing point 44 and configured to sense current flowing therethrough. Other operating characteristics also may be sensed. In this embodiment, the controller 42 may be configured to control the operation of each of the first variable capacitive element 32 and second variable capacitive element 34 to vary the capacitance thereof. For example, separate control lines providing separate control signals may be included.

In operation, the controller 42 may be configured to control the capacitance of each of the first variable capacitive element 32 and second variable capacitive element 34, and more particularly, vary the capacitance of the first variable capacitive element 32 and second variable capacitive element 34 based on, for example, the current sensed at sensing point 44. The controller 42, by varying the capacitance of the first variable capacitive element 32 and second variable capacitive element 34 may provide variable adjustment to the tuning, and more particularly, may provide dynamic frequency tuning and impedance control as described in more detail below. The controller 42 may be operated manually, for example, controlled by an operator or user, or may be operated automatically, for example, controlled by a system controller or program.

It should be noted that when reference is made herein to a capacitive element, inductive element, resistive element or other element, these elements may be provided, modified or replaced with an equivalent element. For example, when an embodiment is shown having a capacitive element, this may include one or more capacitors or elements providing capacitance. Similarly, and for example, when an embodiment is shown having an inductive element, this may include one or more inductors or elements providing inductance. Also, similarly, and for example, when an embodiment is shown having a resistive element, this may include one or more resistors or elements providing resistance.

Figure 2:
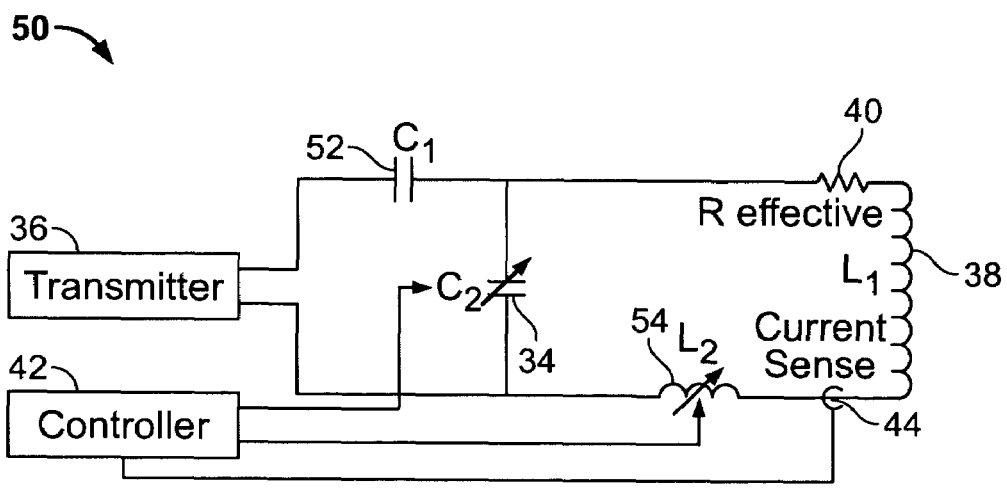
FIG. 2 is a schematic diagram of a resonant circuit tuning system constructed in accordance with an embodiment of the invention having a variable capacitive element and a variable inductive element.

In another embodiment as shown in FIG. 2, a resonant circuit tuning system 50 is provided that is similar to the resonant circuit tuning system 30 (shown in FIG. 1), and accordingly, like reference numerals identify like components. Unlike the resonant circuit tuning system 30, the first variable capacitive element 32 is replaced with a first capacitive element 52. Also a variable inductive element 54 is connected is series between the second variable capacitive element 34 and the inductive element 38.

In this embodiment, the controller 42 may be configured to control the operation of each of the second variable capacitive element 34 and the variable inductive element 54. For example, separate control lines providing separate control signals may be included to control each of the second variable capacitive element 34 and the variable inductive element 54. In operation, the controller 42 may be configured to control the capacitance of the second variable capacitive element 34 and variable inductive element 54, and more particularly, vary the capacitance of the second variable capacitive element 34 and vary the inductance of the variable inductive element 54. The controller 42, by varying the capacitance of the second variable capacitive element 32 and the inductance of the inductive element 54 may provide variable adjustment to the tuning, and more particularly, may provide dynamic frequency tuning and impedance control as described in more detail below.

Figure 3:
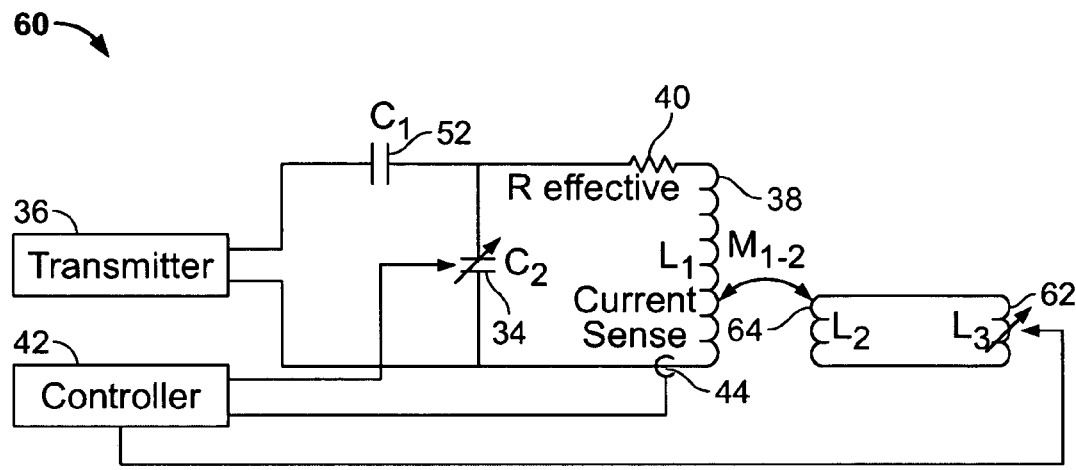
FIG. 3 is a schematic diagram of a resonant circuit tuning system constructed in accordance with an embodiment of the invention having two capacitive elements connected to a resonant tuning portion and a variable inductive element magnetically coupled to the resonant tuning portion.

In another embodiment as shown in FIG. 3, a resonant circuit tuning system 60 is provided that is similar to the resonant circuit tuning system 50 (shown in FIG. 2), and accordingly, like reference numerals identify like components. Unlike the resonant circuit tuning system 30, the variable inductive element 54 that was connected in series between the second variable capacitive element 32 and the inductive element 44 is replaced with a magnetically coupled variable inductive element 62. The variable inductive element 62 is magnetically coupled to the inductive element 38 with a magnetically coupled winding 64, which may be, for example, an inductive element or other coiled element. In general, the magnetically coupled winding 64 may be any type of magnetically coupled element, for example, any type of magnetic field coupled element.

In this embodiment, the controller 42 may be configured to control the operation of each of the second variable capacitive element 34 and the variable inductive element 62. For example, separate control lines providing separate control signals may be included to control each of the second variable capacitive element 34 and the variable inductive element 62. In operation, the controller 42 may be configured to control the capacitance of the second variable capacitive element 34 and variable inductive element 62, and more particularly, vary the capacitance of the second variable capacitive element 34 and vary the inductance of the variable inductive element 62. The controller 42, by varying the capacitance of the second variable capacitive element 34 and the inductance of the inductive element 62 may provide variable adjustment to the tuning, and more particularly, may provide dynamic frequency tuning and impedance control as described in more detail below.

Figure 4:
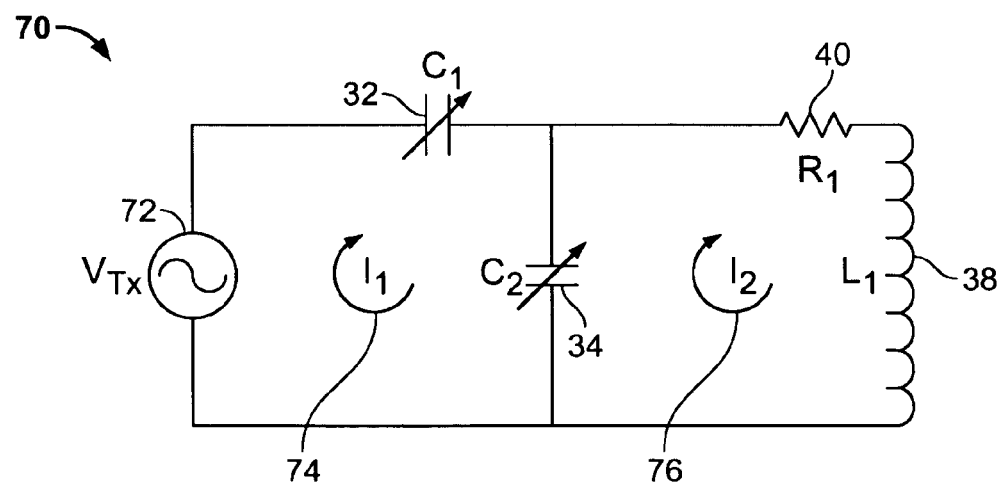
FIG. 4 is a simplified schematic diagram of the resonant circuit tuning system of FIG. 1.

The operation and operating characteristics of the various embodiments of the resonant circuit tuning system will now be described with reference to FIG. 4 illustrating a simplified schematic diagram of FIG. 1. Accordingly, like reference numerals identify like components. This description of the operation and operating characteristics can be similarly applied to the other various embodiments of resonant circuit tuning systems described herein.

In the resonant circuit tuning system 70 shown in FIG. 4, the transmitter 36 (shown in FIG. 1) is represented by a voltage source 72 ($V_{TX}$). The inductive element 38 ($L_1$) represents, for example, a transmit antenna for use in applications, such as, EAS and/or RFID. Losses in the antenna coil as well as losses due to conductive materials in the vicinity of the antenna are combined, lumped together and represented by resistive element 40 ($R_1$). Accordingly, the value of the resistive element 40 changes due to, for example, the effects or influences of conductive materials moving through the magnetic field of the antenna. The first variable capacitive element 32 ($C_1$) and the second variable capacitive element 34 ($C_2$) are used to tune the frequency and resonant impedance at the transmitter.

In particular, and with respect to tuning and impedance control provided by the various embodiments, a solution for Kirchoff's voltage law equations for loops 74 and 76 ($I_1$ and $I_2$, respectively) is provided below. Specifically, the relationship between the current in loop 76 and the input voltage at the voltage source 72 is given by the following Equation 1:

$$V_s = \left[\left(\frac{C_1+C_2}{C_1}\right) \cdot R_1 + j \cdot \left[\left(\frac{C_1+C_2}{C_1}\right) \cdot \omega \cdot L_1 - \frac{1}{\omega \cdot C_1}\right]\right] \cdot I_2 \quad (1)$$

Defining the resonant frequency $\omega_{res}$ as the frequency at which the imaginary term in Equation 1 crosses zero, results in:

$$\omega_{res} = \frac{1}{\sqrt{(C_1+C_2) \cdot L_1}} \quad (2)$$

Further the total capacitance is defined as:

$$C_{total} = C_1 + C_2 \quad (3)$$

and the capacitance ratio is defined as:

$$r = \frac{C_1}{C_1+C_2} \quad (4)$$

Solving for the relationship between $I_1$ and the input voltage $V_{tx}$ at the resonant frequency $\omega_{res}$ results in:

$$I_1 = \left(\frac{C_1}{C_1+C_2}\right)^2 \cdot \frac{1}{R_1} + j \cdot \sqrt{\frac{C_1^2 \cdot C_2^2}{L_1 \cdot (C_1+C_2)^3}} \cdot V_{tx} \quad (5)$$

Equation 5 may be reduced to:

$$I_1 = \left[r^2 \cdot \frac{1}{R_1} + j \cdot (r \cdot (1-r)) \sqrt{\frac{C_{total}}{L_1}}\right] \cdot V_{tx} \quad (6)$$

where the circuit admittance at the transmitter at the resonant frequency $\omega_{res}$ is:

$$Y_{tx} = r^2 \cdot \frac{1}{R_1} + j \cdot (r \cdot (1-r)) \sqrt{\frac{C_{total}}{L_1}} \quad (7)$$

The imaginary term of the admittance is maximum when the capacitance ratio is 0.5 and the relationship between the real and imaginary terms in the admittance defines the phase relationship between the input current $I_1$ and the coil current $I_2$. This phase angle is defined as:

$$\angle Y = \tan^{-1}\left(\frac{R_1}{r^2} \cdot (r \cdot (1-r)) \cdot \sqrt{\frac{C_{total}}{L_1}}\right) \quad (8)$$

When R1 is small or when $C_{total} \ll L_1$ then the phase shift is small and the admittance of the circuit may be reduced to the real term in Equation 7. The input impedance of the circuit is:

$$Z_{tx} = \cdot \frac{R_1}{r^2} \quad (9)$$

where r is defined as the ratio of the series capacitance to the total capacitance according to Equation 4. At the resonant frequency, the current in the antenna coil is:

$$I_2 = \frac{V_{tx}}{R_1} \cdot r \quad (10)$$

whereas the current from the transmitter is:

$$I_1 = \frac{V_{tx}}{R_1} \cdot r^2 \quad (11)$$

Combining Equations 10 and 11 results in:

$$I_1 = r \cdot I_2 \quad (12)$$

Thus, by adjusting the capacitance values of the various embodiments, dynamic tuning may be provided.

Figure 5:
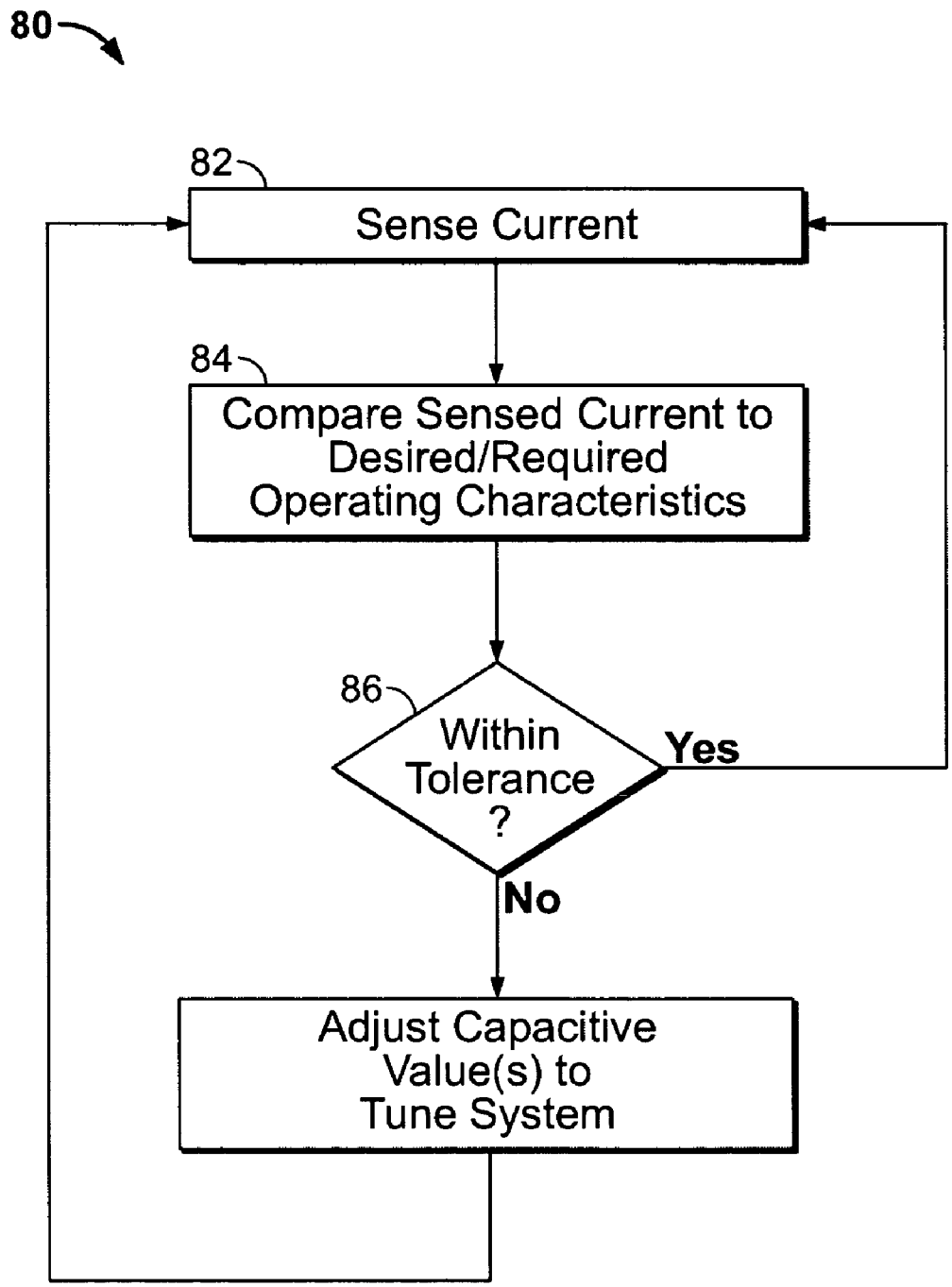
FIG. 5 is a flowchart of a method for resonant tuning in accordance with an embodiment of the invention.

A method 80 for resonant tuning of, for example, an antenna for an EAS or RFID system is shown in FIG. 5 and may include at 82, sensing a current or other operating condition (e.g., voltage) of the system. This sensing may include, for example, sensing a current and/or voltage at the windings of an antenna and/or transmitter output in any manner know in the art and may be provided using the sensing point 44 (shown in FIGS. 1 through 3). For example, this may include sensing when (i) the voltage at the output of the transmitter and the current in the antenna coil are in phase with each other or (ii) the current in the antenna is at a maximum. The sensing may be performed periodically, at predetermined time intervals, upon an event (e.g., loss of power to the system), upon a user input, etc. Thereafter, at 84, the sensed current may be compared to a current for a desired or required operating characteristic for the system. For example, depending on the application or system, a set of operating characteristics may be stored and used to evaluate the operation of the system. The operating characteristics may include, for example, (i) factory programmed operating voltages, currents, etc., (ii) user defined operating characteristics, (iii) application specific operation characteristics, (iv) system component ratings, (v) dynamic operating condition information (e.g., temperature), (vi) manual user input, among others.

Using these operating characteristics, a determination may be made at 86 as to whether the current operation is within tolerances based on the sensed current or other sensed condition. For example, a determination may be made as to whether an antenna of a system is tuned within predetermined operating ranges. If a determination is made at 86 that the system is within tolerances, then at 82 the current may again be sensed. If a determination is made at 86 that the system is not within tolerances, adjustments may be made at 88, and in particular, the variable capacitive or inductive elements (shown in FIGS. 1 through 4) may be varied or adjusted to compensate for any differences, for example, the amount the system is out of tolerance or out of tune. Thereafter, the current again may be sensed at 82. The method 80 may be iteratively performed until the operation of the system is within tolerance (e.g., tuned).

Thus, various embodiments allow dynamic adjustment of the resonant frequency of a circuit (e.g., antenna tuning system) when, for example, permeable materials are moved within a region affecting the system (e.g., around the antenna affecting the coil inductance). The resonant frequency may be adjusted without changing the input impedance of the coil as experienced by the transmitter. Further, the resonant frequency of the circuit may be adjusted by changing the total capacitance of the circuit according to Equation 2 above while also keeping the capacitance ratio constant according to Equations 4 and 9 above.

Additionally, the input impedance of the coil experienced at the transmitter may be dynamically adjusted without adjusting the resonant frequency of the circuit. This adjustment may be used by a control circuit to match the impedance of the resonant circuit to the transmitter output impedance or to adjust the total current flowing into, for example, an antenna without changing the transmitter voltage. The input impedance of the coil may be adjusted by changing the capacitance ratio without changing the total capacitance according to Equations 2, 4 and 9 above.

Further, both the input impedance of the coil as experienced by the transmitter and the resonant frequency of the circuit may be adjusted simultaneously. This may be performed, for example, when adjusting the circuit tuning in response to a conductive material that is moved within the region around an antenna and that affects both the inductance of the coil and the losses of the antenna. The resonant frequency of the circuit may be adjusted by changing the total capacitance of the circuit according to Equation 2 above and the input impedance of the coil may be readjusted to compensate for changes in the resistance by adjusting the capacitance ratio according to Equations 4 and 9 above.

Thus, using two reactive elements, for example, two capacitors, the first in series between, for example, a transmitter and an antenna coil and the second in parallel with the antenna coil, dynamic tuning may be provided. Specifically, at least one of the capacitors may be variable and controlled (by the system controller or by other means) to provide an adjustable capacitance ratio. To provide independent control of the tuning of the resonant frequency, a second variable reactive element also may be added such that: 1) the capacitance ratio may be varied without changing the resonant frequency, 2) the resonant frequency may be varied without changing the capacitance ratio, or 3) both the resonant frequency and the capacitance ratio may be varied simultaneously. The second variable reactive element may be, for example: 1) a second variable capacitor, 2) a variable inductor placed in series with the inductive element (e.g., antenna), or 3) a reactive element magnetically coupled into the circuit via the magnetic field of the antenna.

The various embodiments or components, for example, the controllers or components therein, may be implemented as part of one or more computer systems, which may be separate from or integrated with the tuning system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Further, it is to be understood that variations and modifications of the various embodiments of the present invention can be made without departing from the scope of the various embodiments. It is also to be understood that the scope of the various embodiments of the invention are not to be interpreted as limited to the specific embodiments disclosed herein, but only in accordance with the appended claims when read in light of the forgoing disclosure.

What is claimed is:

1. A resonant circuit tuning system comprising:
a resonant circuit having a first capacitive element in series between a transmitter and an antenna coil and a second capacitive element in parallel with the transmitter and the antenna coil, at least one of the first capacitive element and second capacitive element configured to be varied;
a controller for controlling a variable value of at least one of the first and second capacitive elements; and
a variable inductive element connected in one of (i) a series arrangement with the antenna and (ii) magnetically coupled to the antenna.

2. A resonant circuit tuning system in accordance with claim 1 wherein the controller is configured to control at least one of the variable capacitive element and variable inductive element to adjust at least one of a resonant frequency and a resonant impedance of the resonant circuit.

3. A resonant circuit tuning system in accordance with claim 1 wherein the resonant circuit is configured in one of a series and a parallel arrangement.

4. A resonant circuit tuning system in accordance with claim 1 wherein the controller is configured to dynamically adjust at least one of the first capacitive element and second capacitive element based on a sensed current.

5. A resonant circuit tuning system in accordance with claim 1 wherein at least one of the first capacitive element and second capacitive element comprises a variable capacitor and the controller is configured to adjust a capacitance ratio.

6. A resonant circuit tuning system in accordance with claim 1 wherein the resonant circuit is configured to operate in connection with at least one of an Electronic Article Surveillance (EAS) system and a Radio Frequency Identification (RFID) system.

* * * * *